(12) United States Patent
Oh et al.

(10) Patent No.: US 10,074,251 B2
(45) Date of Patent: *Sep. 11, 2018

(54) SECURITY VIDEO DETECTION OF PERSONAL DISTRESS AND GESTURE COMMANDS

(71) Applicant: Honeywell International Inc., Morristown, NJ (US)

(72) Inventors: Eric Oh, Syosset, NY (US); David S. Zakrewski, Babylon, NY (US); Mi Suen Lee, Hales Corners, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,214

(22) Filed: Jun. 29, 2016

(65) Prior Publication Data

US 2016/0314666 A1 Oct. 27, 2016

Related U.S. Application Data

(63) Continuation of application No. 12/950,095, filed on Nov. 19, 2010, now Pat. No. 9,432,639.

(51) Int. Cl.
*G08B 13/196* (2006.01)
*G06K 9/00* (2006.01)
*H04N 7/18* (2006.01)

(52) U.S. Cl.
CPC ... *G08B 13/19608* (2013.01); *G06K 9/00389* (2013.01); *G06K 9/00771* (2013.01); *G06K 9/00885* (2013.01); *G08B 13/19613* (2013.01); *H04N 7/188* (2013.01)

(58) Field of Classification Search
CPC .......... G06K 9/00389; G06K 9/00771; G06K 9/00885; G08B 13/19608; G08B 13/19613; H04N 7/188
USPC ........................................................ 348/143
See application file for complete search history.

(56) References Cited

U.S. PATENT DOCUMENTS

| | | | |
|---|---|---|---|
| 6,185,153 B1 * | 2/2001 | Hynes .................... | G01S 7/527 367/118 |
| 6,678,413 B1 * | 1/2004 | Liang .................... | A61B 5/1113 348/169 |
| 7,504,942 B2 * | 3/2009 | Marman ............ | G06K 9/00362 340/541 |
| 7,613,324 B2 * | 11/2009 | Venetianer ......... | G06K 9/00369 348/143 |

(Continued)

*Primary Examiner* — Francis G Geroleo
(74) *Attorney, Agent, or Firm* — Husch Blackwell LLP

(57) ABSTRACT

Systems and methods for detecting personal distress and gesture commands in security video are provided. Some methods can include receiving a sequence of images from a video device monitoring a secured area, analyzing the sequence of images to detect a presence of a human in the sequence of images, when the presence of the human is detected in the sequence of images, analyzing the sequence of images to detect one of a plurality of contexts that requires an action in the sequence of images, and when the one of the plurality of contexts that requires the action is detected in the sequence of images, transmitting a signal to execute the action. Each of the plurality of contexts can include a respective act performed by the human or a respective condition of the human irrespective of the human being in motion or being stationary.

20 Claims, 1 Drawing Sheet

(56) References Cited

U.S. PATENT DOCUMENTS

| | | | |
|---|---|---|---|
| 2004/0120581 A1* | 6/2004 | Ozer | G06K 9/00335 382/224 |
| 2004/0220753 A1 | 11/2004 | Tabe | |
| 2005/0002561 A1* | 1/2005 | Monachino | G06K 9/6293 382/159 |
| 2005/0281435 A1* | 12/2005 | Aggarwal | G06K 9/00335 382/103 |
| 2006/0093190 A1 | 5/2006 | Cheng et al. | |
| 2007/0061696 A1* | 3/2007 | Vallone | G06F 17/3079 715/255 |
| 2007/0121999 A1* | 5/2007 | Ma | G06K 9/00342 382/103 |
| 2007/0198850 A1* | 8/2007 | Martin | G07C 9/00087 713/186 |
| 2008/0043101 A1 | 2/2008 | Sharma | |
| 2009/0138805 A1 | 5/2009 | Hildreth | |
| 2009/0212944 A1* | 8/2009 | Howe | G08B 13/2491 340/541 |
| 2011/0133930 A1* | 6/2011 | Blum | G08B 13/19602 340/545.2 |

* cited by examiner

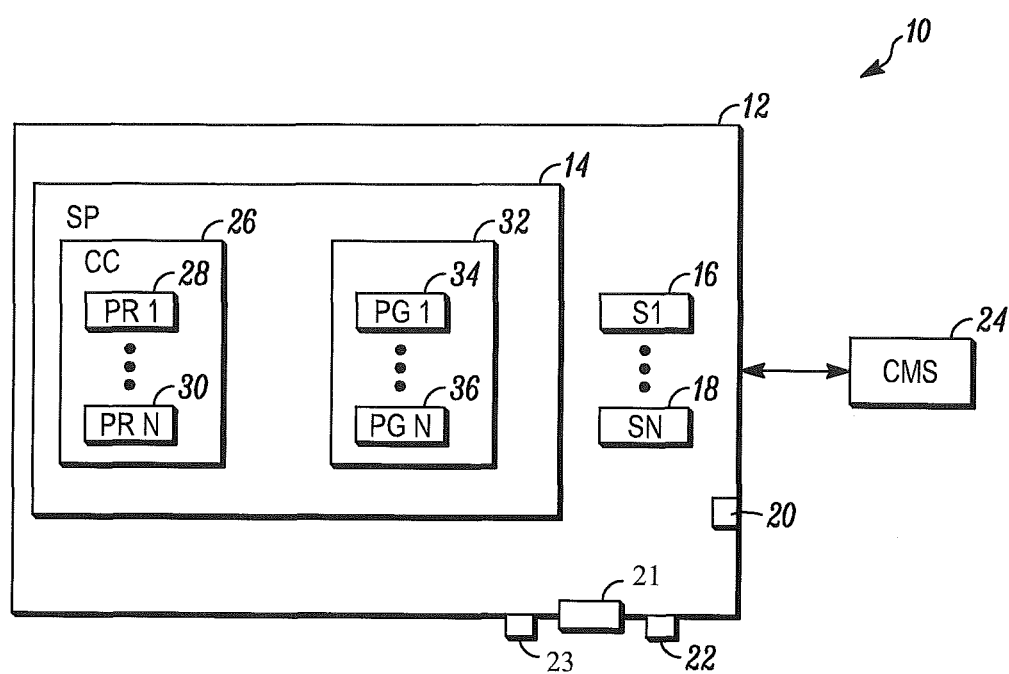

SECURITY VIDEO DETECTION OF PERSONAL DISTRESS AND GESTURE COMMANDS

CROSS-REFERENCE TO RELATED APPLICATIONS

This application is a continuation of and claims the benefit of the filing date of U.S. application Ser. No. 12/950,095 filed Nov. 19, 2010.

FIELD OF THE INVENTION

The field of the invention relates to security systems and, more particularly, to video monitoring in security systems.

BACKGROUND OF THE INVENTION

Security systems are generally known. Such systems typically include some form of physical barrier to intruders, including one or more sensors to detect the intruders who are able to surmount the physical barrier.

In the case of a home, the physical barrier may be the exterior walls of the home. In this case, the sensors may include door sensors that detect the opening or closing of doors. Window sensors may also be provided to detect the intruders who attempt to enter through a window.

The sensors within the home are typically electrical switches that are mechanically connected to a door or the window. In other cases, motion detectors may be used that are based upon infrared detection of human intruders or the processing of video signals to detect human shapes.

Security systems typically operate in three modes, including disarmed, alarm away, and alarm stay. In the disarmed mode, a control panel does not report a burglary alarm when a sensor is activated, while in the alarm away mode the control panel sounds the alarm when a sensor is activated and may report the alarm to a central monitoring station. In the alarm stay mode (used during night time hours when a homeowner is present), the control panel may only monitor the sensors along a periphery of the home.

While known security systems are effective, authorized users may still be vulnerable to attack when they enter or exit a secured area. Accordingly, a need exists for better ways of protecting users of security systems.

BRIEF DESCRIPTION OF THE DRAWING

FIG. 1 is a block diagram of a security system shown generally in accordance with an illustrated embodiment of the invention.

DETAILED DESCRIPTION OF AN ILLUSTRATED EMBODIMENT

FIG. 1 is a block diagram of a security system 10 shown generally in accordance with an illustrated embodiment of the invention. The security system 10 may include a secured area 12 protected via a security panel 14 and one or more intrusion sensors 16, 18. One or more access points (e.g., doors) 21 may be provided for entry into and egress from the secured area 12.

Included within the security panel 14 may be control circuitry 26 for controlling the security system 10. The control circuitry 26 may include one or more computer processors 28, 30 operating under control of one or more sets of computer program code (programs) 34, 36 executing on the processors 28, 30 or saved in a non-transitory computer readable medium 32.

The secured area 12 may also include a number of video monitoring and collection devices (e.g., cameras) 20, 22. The video devices 20, 22 may be used for real time monitoring by security personnel. Alternatively, a video based, motion detection processor 28, 30 within the security panel 16 may receive video from one of the devices 20, 22 and process the video to detect intruders by detecting changes between successive frames of the video.

The security system 10 may operate in one or more modes including an alarm away mode, an alarm stay mode and a disarmed mode. In the alarm away mode, an alarm processor 28, 30 may monitor all of the intrusion sensors 16, 18 and any video based, motion detection processors 28, 30 for activation by an intruder. In the alarm stay mode, the alarm processor 28, 30 only monitors the sensors 16, 18 around a perimeter of the secured area 12. In response to the activation of one of the sensors 16, 18, the alarm processor 28, 30 may compose and send an alarm message to a central monitoring station 24. The central monitoring station may respond by dispatching a private security service or by notifying a local police department.

The security system 10 may be controlled via a keypad and display 23. The keypad and display may be separate devices or may be combined in the form of a touch sensitive display 23. The display 23 may be located outside the secured area 12 as shown in FIG. 1 or may be inside.

In order to activate a particular operating mode within the security system 10, an authorized user may enter an identifying code and then activate a mode selection button on the display 23. For example, the authorized user may enter a number sequence 1, 2, 3, 4 and activate a softkey labeled "ALARM AWAY." In response, the security system 10 would enter the alarm away mode.

Included within the security system 10 may be one or more human context detection processors 28, 30 that are programmed to detect a human presence within a sequence of images from the video devices 20, 22 and to analyze video frames associated with that presence to detect specific contexts that require further action. The context detection processors 28, 30 may be particularly useful when used to process the video obtained from a camera 20, 22 located adjacent an entrance 21 to the secured area 12.

For example, a context detection processor 28, 30 may be programmed to detect a context of duress and to send a silent alarm to the central monitoring station 24 upon detection of that duress. The detection of the duress, in this case, can mean the detection of a specific physical action or the detection and comparison of a specific biometric parameter with a threshold value.

It should be specifically noted that the context detection processor 28, 30 does not operate by detecting locomotion or movement of humans across an image. Instead, the context detection processor 28, 30 detects specific acts performed by or a specific condition of a person. That being said, it should also be noted that those specific acts or those specific conditions could just as well be detected while the person is in motion as well as when the person is stationary and not moving.

As a more specific example, if the authorized user were being threatened by a criminal with a weapon in order to coerce the authorized user to disarm the security system 10 in order to allow the criminal access to the secured area 12, then the context detection processor 28, 30 may be able to detect that context and to generate the silent alarm. The alarm may be silent in order to not jeopardize the safety of the authorized person.

In general, the context detection processor 28, 30 may analyze the contexts using a number of specific steps and/or modes. These specific steps and/or modes may be executed by a single processor 28, 30 in sequence or by a number of associated processors 28, 30 programmed to accomplish that step or mode.

For example, a first processor 28, 30 (e.g., a human detection processor) functions to detect human figures within video images. If no human figures are detected within the video images, then the first processor simply continues to process the video frames of the video from the video devices 20, 22.

Alternatively, if the human detection processor 28, 30 were to detect first and second human figures, then that processor (or another associated processor 28, 30) may begin to process outlines of those figures to detect threatening gestures or sounds. A threatening gesture could be an upraised arm.

A threatening sound may be detected by a microphone associated with the video devices 20, 22. In this case, a sound processor 28, 30 may first filter sound to isolate those portions of the sound associated with a particular threat. One such threat could be loud voices. Another threatening sound may be gunfire.

In general, the threatening gestures or sounds may be associated with a threshold level defined by the context. In the case of voices, the threshold level may be set to that of a loud voice or shouting. In the case of gestures, such as an upraised arm, the threshold level may be associated with the speed with which the arm was raised and/or the speed of any downward motion that follows raising the arm.

In addition, the threatening gestures or sounds may be logically ANDed with or supplanted by other contexts or context parameters. One context parameter is the detection of the weapon. In this regard, another processor (e.g., a weapons processor) 28, 30 may identify the distal end of a human figure's arm and process the distal end for any unusual image details that could be construed as the weapon. In this regard, the detection of a gun is relatively straightforward. On the other hand, the detection of a rock held in the hand of the criminal would be less conclusive. In this case, a threat factor or value may be assigned to this image detail that is added to other threat factors or values (e.g., loud voices, the speed of arm movement, etc.). The threshold value may be used in conjunction with the summation of threat factors or values.

Another context parameter may be biometric. In one example, the video devices 20, 22 may collect heat signatures of portions of the human figures (e.g., the faces). The heat signatures of the faces may be compared with the threshold value to again determine if the threat factor or value exceeds the threshold value.

Another processor 28, 30 (e.g., a face recognition processor) may be programmed to compare a face portion of detected human figures with templates of authorized users to recognize the authorized user from within a group of two or more of the human figures. In this case, a heat signature of the authorized user recognized may be taken as a sign of the duress where the heat signature exceeds the threshold value for that user.

Another processor 28, 30 (e.g., a gesture processor) may be programmed to identify predefined actions by authorized users that have already been (or are concurrently) identified by the face recognition processor 28, 30. In this case, the authorized user may preprogram or define certain overt gestures as the sign of the duress. For example, an act of the authorized user placing the palm of his/her hand over his/her face with fingers spread and holding his/her hand there for some predefined period while that person approaches the entrance 21 may be a predetermined gesture of the duress.

Alternatively, repetitive acts may be a predefined indicator of the duress. For example, the authorized user placing his/her forefinger to his/her nose twice in the predefined period may be the predefined indicator of the duress.

As a still further alternative, the predefined actions by the authorized user may be used to execute certain processes by the security system 10 as a convenience to the authorized user or to defuse a situation where the authorized user feels threatened. For example, if the authorized user is approached by a stranger while attempting to enter the secured area 12, then the authorized user may perform a predefined action in order to cause the security system 10 to perform the processes associated with that predefined action. The processes performed in response to the predefined action may be for the security system 10 to provide an audio announcement through a speaker located adjacent the entrance 21 that the security system 10 is arming. Alternatively, the processes may involve the security system 10 announcing that a video recording is being made of all actions at that location. In this case, the audio announcement may operate as a deterrent to the stranger approaching and intent on performing some criminal act.

As a still further alternative, another processor 28, 30 (e.g., a fight detection processor) may be programmed to detect a fight between two detected human figures. In this case, the momentary merging of the two detected human figures and the speed of motion of the appendages of the two detected human figures may cause the fight detection processor to detect the fight and then compose and send the alarm message to the central monitoring station announcing the fight. This may be a lower level alarm message since it is outside the secured area 12 unless one of the two detected human figures can be identified as the authorized user. If one of the two detected human figures is the authorized user, then a higher level alarm is sent since this may be a criminal assault on the authorized user or an attempt to gain access to the secured area 12.

A specific embodiment of a method and an apparatus for detecting intruders has been described for the purpose of illustrating the manner in which the invention is made and used. It should be understood that the implementation of other variations and modifications of the invention and its various aspects will be apparent to one skilled in the art and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:
1. A method comprising:
receiving a sequence of images from a video device monitoring a secured area;
analyzing the sequence of images to detect a presence of a first human and a second human in the sequence of images;
when the presence of the first human and the second human is detected in the sequence of images, analyzing the sequence of images to detect one of a plurality of contexts that requires an action in the sequence of images;

when the one of the plurality of contexts that requires the action is detected in the sequence of images and the first human or the second human is recognized as an authorized user of a security system protecting the secured area, transmitting a high priority signal to execute the action; and when the one of the plurality of contexts that requires the action is detected in the sequence of images and neither the first human nor the second human is recognized as the authorized user of the security system protecting the secured area, transmitting a low priority signal to execute the action, wherein each of the plurality of contexts includes a respective act performed by the first human or the second human or a respective condition of the first human or the second human, and wherein each of the plurality of contexts is detectable independently of movement of the first human or the second human within the sequence of images.

2. The method of claim 1 wherein the one of the plurality of contexts includes duress, and wherein transmitting the high priority signal or the low priority signal to execute the action includes transmitting a silent alarm to a central monitoring station or providing an audio announcement through a speaker adjacent the video device.

3. The method of claim 2 further comprising detecting a physical action or a threatening gesture by the first human or the second human in the sequence of images, wherein the physical action or the threatening gesture indicates the duress.

4. The method of claim 3 wherein the threatening gesture indicates the duress when the threatening gesture exceeds a predetermined threshold value.

5. The method of claim 2 further comprising:
detecting a biometric parameter of the first human or the second human in the sequence of images; and
comparing the biometric parameter to a predetermined threshold value,
wherein the biometric parameter indicates the duress when the biometric parameter exceeds the predetermined threshold value.

6. The method of claim 2 wherein the first human is recognized as the authorized user of the security system protecting the secured area.

7. The method of claim 6 further comprising detecting a weapon carried by the second human threatening the authorized user of the security system protecting the secured area or the second human fighting with the authorized user of the security system protecting the secured area in the sequence of images, wherein the second human includes an unauthorized user.

8. The method of claim 2 further comprising detecting a threatening sound captured by a microphone associated with the video device, wherein the threatening sound indicates the duress.

9. The method of claim 8 wherein the threatening sound indicates the duress when the threatening sound exceeds a predetermined threshold value.

10. The method of claim 2 further comprising:
detecting multiple ones of the plurality of contexts that require the action in the sequence of images;
assigning a respective threat value to each of the multiple ones of the plurality of contexts;
identifying a total threat value by adding the respective threat value assigned to each of the multiple ones of the plurality of contexts; and
comparing the total threat value to a predetermined threshold value,
wherein the total threat value indicates the duress when the total threat value exceeds the predetermined threshold value.

11. A system comprising:
a programmable processor; and
executable control software stored on a non-transitory computer readable medium,
wherein the programmable processor and the executable control software receive a sequence of images from a video device monitoring a secured area,
wherein the programmable processor and the executable control software analyze the sequence of images to detect a presence of a first human and a second human in the sequence of images,
wherein, when the programmable processor and the executable control software detect the presence of the first human and the second human in the sequence of images, the programmable processor and the executable control software analyze the sequence of images to detect one of a plurality of contexts that requires an action in the sequence of images,
wherein, when the programmable processor and the executable control software detect the one of the plurality of contexts that requires the action in the sequence of images and the first human or the second human is recognized as an authorized user of a security system protecting the secured area, the programmable processor and the executable control software transmit a high priority signal to execute the action,
wherein, when the programmable processor and the executable control software detect the one of the plurality of contexts that requires the action in the sequence of images and neither the first human nor the second human is recognized as the authorized user of the security system protecting the secured area, the programmable processor and the executable control software transmit a low priority signal to execute the action,
wherein each of the plurality of contexts includes a respective act performed by the first human or the second human or a respective condition of the first human or the second human, and
wherein each of the plurality of contexts is detectable independently of movement of the first human or the second human within the sequence of images.

12. The system of claim 11 wherein the one of the plurality of contexts includes duress, and wherein the programmable processor and the executable control software transmitting the high priority signal or the low priority signal to execute the action includes the programmable processor and the executable control software transmitting a silent alarm to a central monitoring station or providing an audio announcement through a speaker adjacent the video device.

13. The system of claim 12 wherein the programmable processor and the executable control software detect a physical action or a threatening gesture by the first human or the second human in the sequence of images, and wherein the physical action or the threatening gesture indicates the duress.

14. The system of claim 13 wherein the threatening gesture indicates the duress when the threatening gesture exceeds a predetermined threshold value.

15. The system of claim 12 wherein the programmable processor and the executable control software detect a biometric parameter of the first human or the second human in the sequence of images and compare the biometric parameter to a predetermined threshold value, and wherein the biometric parameter indicates the duress when the biometric parameter exceeds the predetermined threshold value.

16. The system of claim 12 wherein the first human is recognized as the authorized user of the security system protecting the secured area.

17. The system of claim 16 wherein the programmable processor and the executable control software detect a weapon carried by the second human threatening the authorized user of the security system protecting the secured area or the second human fighting with the authorized user of the security system protecting the secured area in the sequence of images, and wherein the second human includes an unauthorized user.

18. The system of claim 12 wherein the programmable processor and the executable control software detect a threatening sound captured by a microphone associated with the video device, and wherein the threatening sound indicates the duress.

19. The system of claim 18 wherein the threatening sound indicates the duress when the threatening sound exceeds a predetermined threshold value.

20. The system of claim 12 wherein the programmable processor and the executable control software detect multiple ones of the plurality of contexts that require the action in the sequence of images, assign a respective threat value to each of the multiple ones of the plurality of contexts, identify a total threat value by adding the respective threat value assigned to each of the multiple ones of the plurality of contexts, and compare the total threat value to a predetermined threshold value, and wherein the total threat value indicates the duress when the total threat value exceeds the predetermined threshold value.

* * * * *